July 12, 1927. 1,635,288
P. PIERCE
WRAPPING MACHINE
Filed March 25, 1926 5 Sheets-Sheet 3
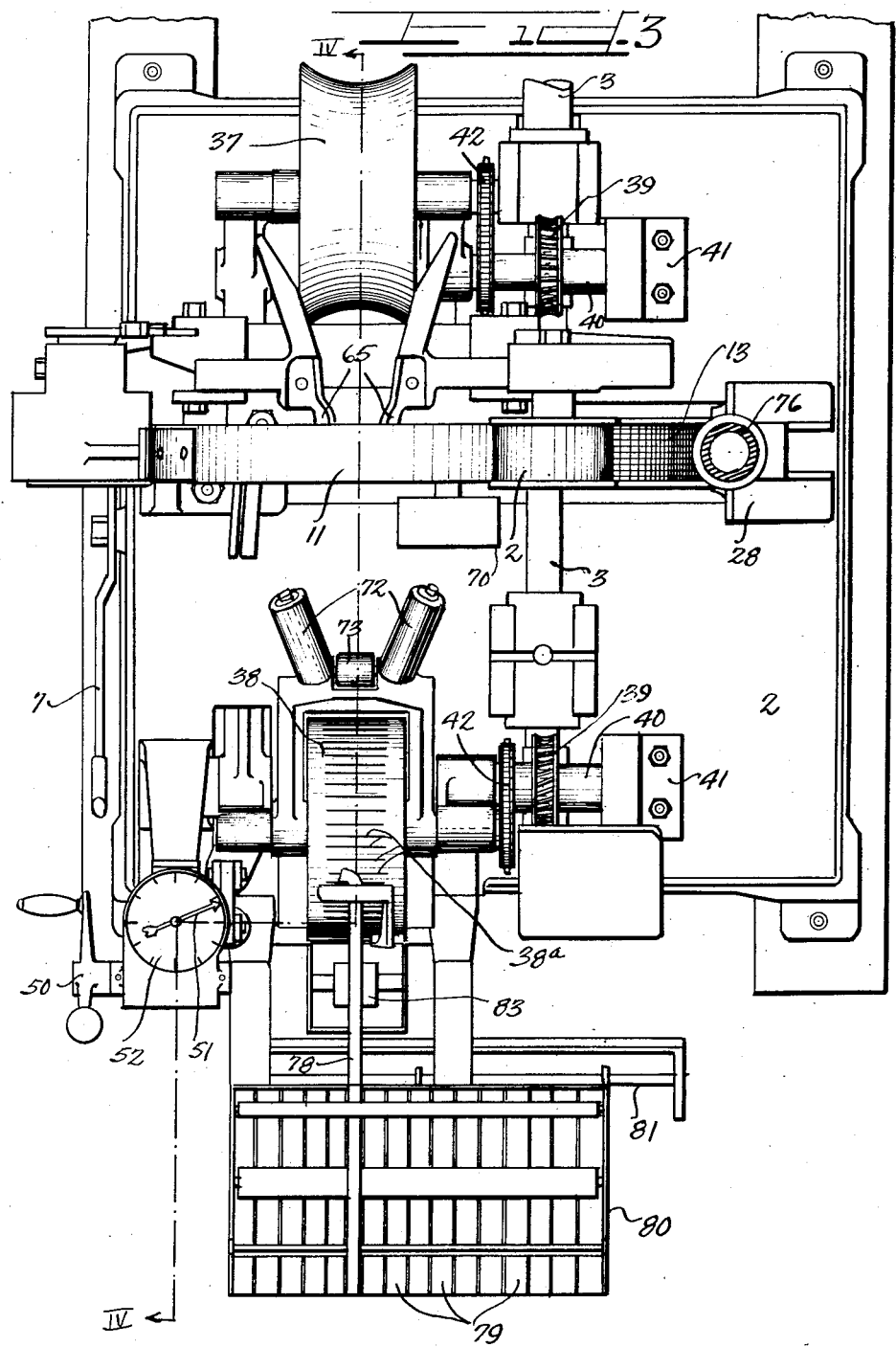
Inventor
Paul Pierce
By Charles H. Hills
Attys

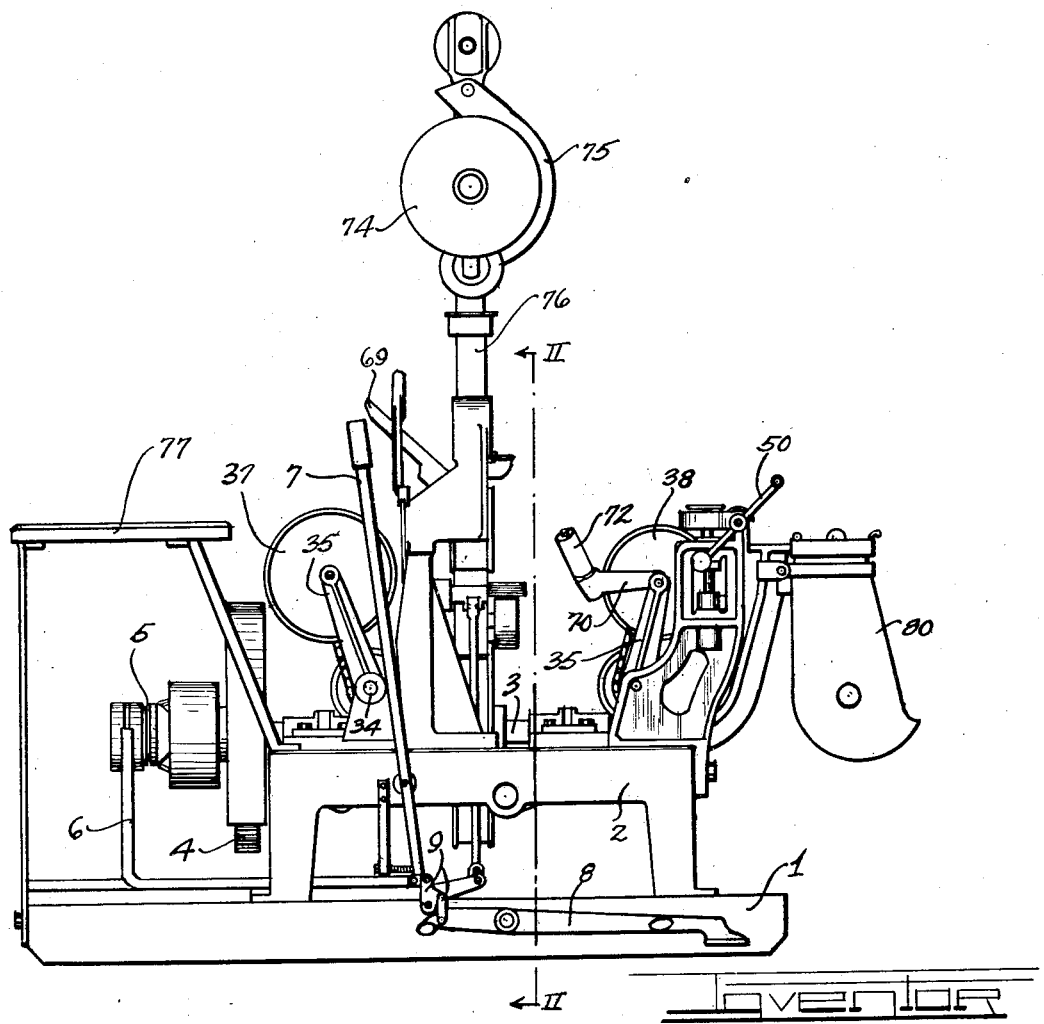

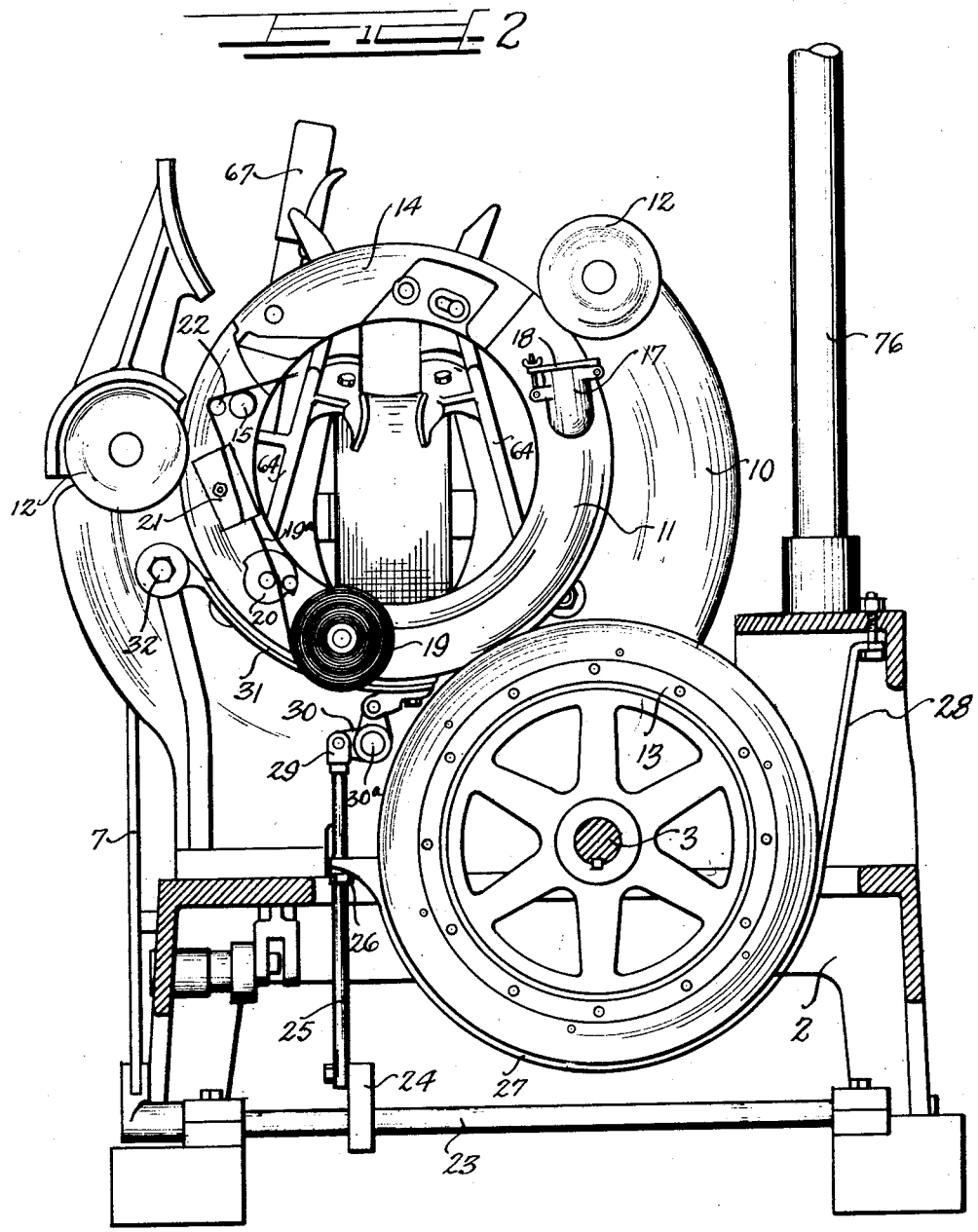

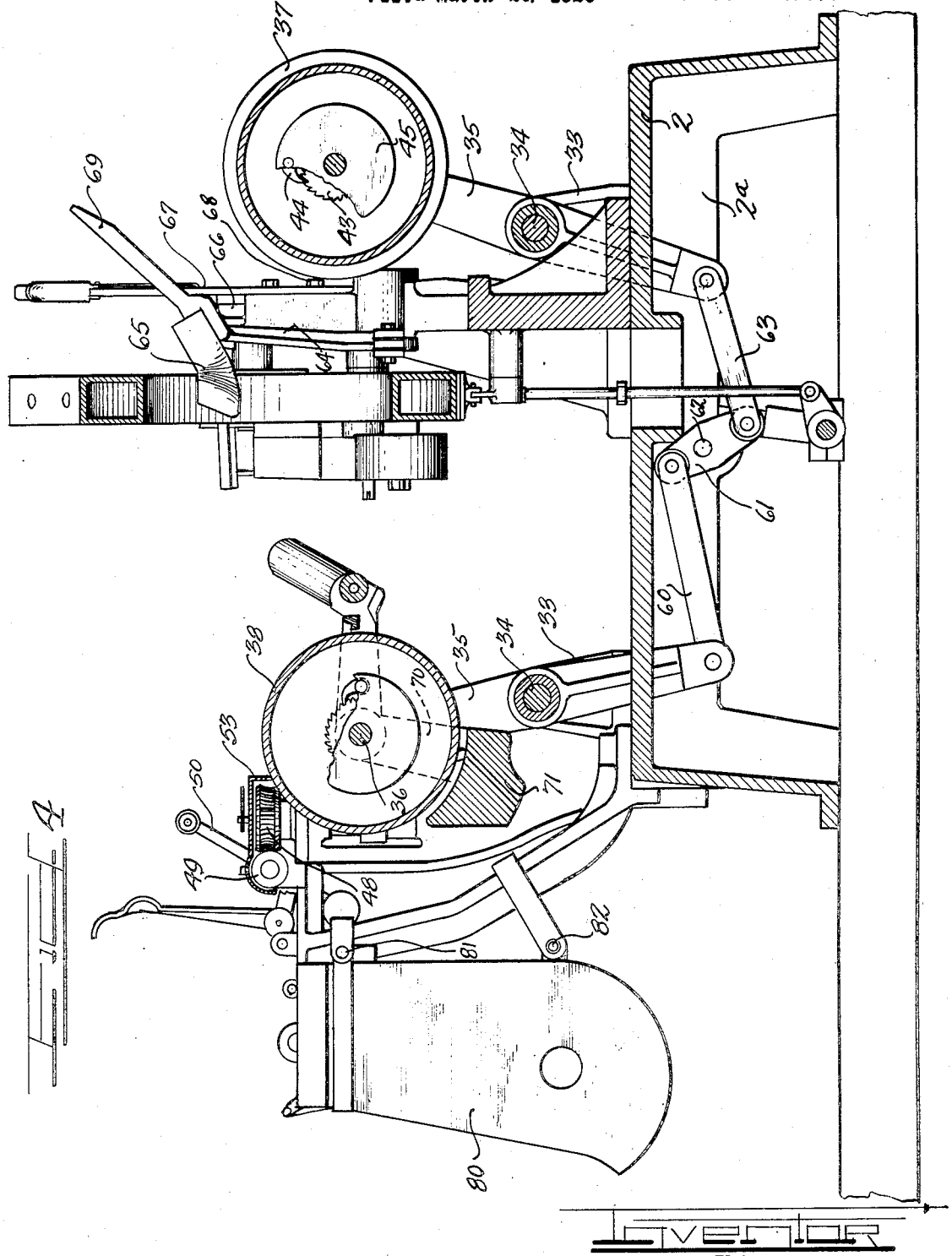

July 12, 1927.
P. PIERCE
WRAPPING MACHINE
Filed March 25, 1926
1,635,288
5 Sheets-Sheet 5
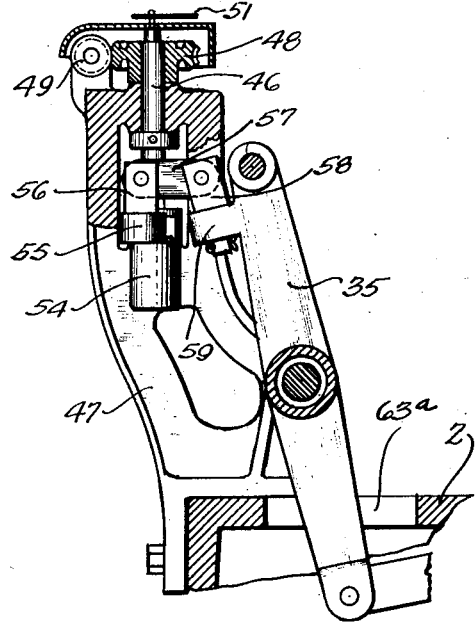
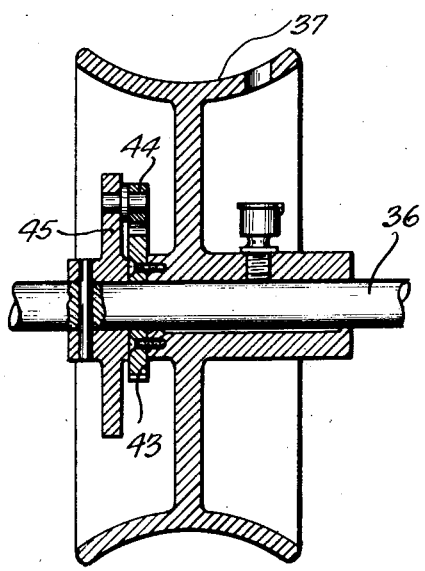
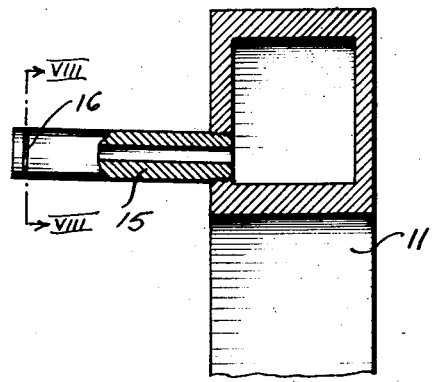
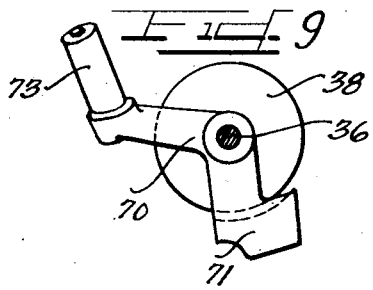
Inventor
Paul Pierce
By Charles M. Hill
Attys Patented July 12, 1927.

1,635,288

UNITED STATES PATENT OFFICE.

PAUL PIERCE, OF CHICAGO, ILLINOIS, ASSIGNOR TO PIERCE WRAPPING MACHINE COMPANY, A CORPORATION OF ILLINOIS.

WRAPPING MACHINE.

Application filed March 25, 1926. Serial No. 97,190.

This invention relates to a wrapping machine and particularly to a machine which is adapted to apply a protective wrapping to tire casings and similar annular articles.

It is an object of this invention to provide a wrapping machine embodying improved mechanisms for positioning a tire casing or other annular article to be wrapped thereby.

It is also an important object of this invention to provide a wrapping machine having article supporting means which permit of easy positioning of relatively heavy articles.

It is a further important object of this invention to provide a wrapping machine having improved adjusting and control mechanisms and improved means for supporting and rotating an article to be wrapped thereby.

Other and further important objects of this invention will be apparent from the disclosures in the specification and the accompanying drawings.

The invention (in a preferred form) is shown on the drawings and hereinafter more fully described.

On the drawings:

Figure 1 is a side elevation of a wrapping machine embodying the principles of this invention.

Figure 2 is an enlarged fragmentary section on the line II—II of Figure 1.

Figure 3 is a top plan view of the wrapping machine shown in Figure 1.

Figure 4 is a fragmentary section on the line IV—IV of Figure 3 with parts removed and parts shown in elevation.

Figure 5 is an enlarged sectional detail view showing the positioning mechanism for the tire supporting rolls.

Figure 6 is an enlarged longitudinal section through one of the pair of supporting rolls showing the ratchet driving mechanism.

Figure 7 is a fragmentary sectional view with parts in elevation showing a portion of the shuttle and the adhesive discharge means thereon.

Figure 8 is a section on the line VIII—VIII of Figure 7.

Figure 9 is an enlarged detail section with parts in elevation showing one of the tire guiding rolls.

As shown on the drawings:

The reference numeral 1 indicates a suitable foundation or sub-frame which supports a base 2 on which the various operating mechanisms are mounted. Extending longitudinally of the top of the base 2 and journaled in suitable bearings mounted on said base, is a main drive shaft 3 which is power driven from a gear 4 through a suitable clutch connection 5, said clutch connection being controlled from a linkage 6 connected to a pivoted hand lever 7 and a foot lever 8, said foot lever 8 being connected to the linkage 6 through suitable link connections 9 (Figure 1).

Supported on the base 2 and extending upwardly therefrom is a yoke shaped shuttle frame 10 which rotatably supports a hollow annular shuttle 11 in roller guides 12 which are mounted at the outer ends of the yoke formed by said frame. The lower portion of the shuttle is supported and frictionally driven by a friction wheel 13 which is keyed to the main drive shaft 3 as clearly shown in Figure 2. As previously stated, the shuttle 11 is of annular form having a cap which is formed thereon to permit the insertion of a tire casing or other annular article when the eye of said shuttle is closed by a pivoted gate 14 forming a part of the complete annular shuttle when it is closed. With the exception of the portion formed by said gate 14, the shuttle 11 is of hollow construction as shown in detail in Figure 7, the interior of the shuttle thus forming a receptacle for a suitable adhesive which is applied to a strip of wrapping material prior to the application of said wrapping material to the annular object to be wrapped through a hollow nozzle or pin 15 which is provided with an outlet opening at 16 as clearly shown in Figures 7 and 8. Adhesive is poured into the interior of the shuttle 11 through a filler cup 17 secured to the face of said shuttle and communicating with the interior thereof. In order to prevent leakage from the filler cup when the machine is in operation said filler cup is provided with a liquid-tight cover 18 (Figure 2).

A wrapping material applying mechanism which is shown in Figure 2 is secured to the face of the shuttle 11 and comprises a rotatably supported reel of wrapping material 19, a tension device 20 over which the wrapping material is led from said reel, an edge folder device 21, a guiding roll or pin 22, and a hollow pin 15, previously referred to, from which adhesive is applied to the strip of wrapping material which is indicated by the reference numeral 19ª. In order to control the rotation of the shuttle and to bring the same to a stop when the clutch 5 is disconnected, the handle lever 7 and the foot lever 8 are each connected to a rotatable shaft 23 which has secured thereto intermediate its ends a crank arm 24, said crank arm having connected thereto a rod 25 which has threaded thereon intermediate its ends a nut 26. Said nut 26 affords an adjustable support for the free end of a brake band or braking strip 27 which contacts the lower face of the friction pulley 13 and which is connected permanently to its other end to an upstanding portion 28 of the base 2. The upper end of the rod 25 is provided with a clevis 29 which is pivotally connected to one arm of a bell crank 30, the other arm of which is pivotally connected to the free end of a brake band or braking strip 31. The fixed end of said braking strip 31 is pivotally secured to the shuttle frame 10 at 32 so that upward movement of the rod 25 due to rotation of the shaft 23 through actuation of either the foot or hand control levers applies the braking strip 31 to the periphery of the shuttle 11. The bell crank 30 previously referred to is pivoted to the face of the shuttle frame at 30ª as clearly shown in Figure 2.

The wrapping machine of this invention provides improved means for rotatably supporting the tire or other annular article to be wrapped and the construction of these means will now be described.

Extending upwardly from the base 2 are pairs of brackets 33 which are mounted adjacent either end of said base and which support transverse shafts 34 as clearly shown in Figure 4. Rotatably mounted on each of said shafts 34 between the brackets 33 are spaced arms 35 rotatably mounted on a shaft 36, and rotatably supported by and extending between the upper ends of each pair of arms 34 are driving and supporting rolls which I have indicated by the reference numerals 37 and 38. The driving and supporting roll 37 is preferably made with a concave periphery as indicated in Figure 6, while the driving and supporting roll 38 is preferably corrugated as indicated at 38ª (Figure 3) to increase the tractive engagement thereof with a tire casing or other annular article to be rotated. The rolls 37 and 38 are driven from the main drive shaft 3 through worms on said drive shaft which mesh with worm wheels 39 mounted on shafts 40 which are journaled at their outer ends in brackets 41 extending upwardly from the base 2 and which are journaled at their inner ends in extensions formed on the brackets 33 in alignment with the shafts 34. The drive from the shafts 40 to the shafts 36 is afforded by sprockets and sprocket chains which are clearly shown at 42 in Figure 3. The rolls 37 and 38 are connected to the shafts 36 so as to be driven thereby in a forward direction and at the same time to permit of free backward or reverse rotation of said rolls. This connection, which is a ratchet connection, is clearly shown in Figures 4 and 6 and comprises ratchet wheels 43 which are secured to the hubs of said driving and supporting rolls and which cooperate with ratchets 44 pivotally mounted on disks 45 which are pinned to the shafts 36 as clearly shown in Figure 6. While the ratchet 44 is shown as of the gravity type, it is understood that spring actuated ratchets might be used if desired.

This invention further provides an improved mechanism for simultaneously moving said rolls 37 and 38 toward or away from each other to accommodate different sizes of tire casings or similar annular articles and to properly center or position said articles relative to the shuttle 11. This mechanism which is shown in detail in Figures 1, 3, 4 and 5 comprises a vertical shaft 46 which is pivotally mounted in a bracket 47 secured to and extending upwardly from the base 2. Secured to the upper end of said shaft 46 is a worm wheel 48 which is adapted to be driven by a horizontally positioned worm 49 pivotally supported on the upper end of the bracket 47. Said worm 49 may be rotated by the operator through a crank 50 (Figure 3) and in order to indicate to the operator the proper position for various sized tire casings, the shaft 46 is provided at its extreme outer end with a pointer 51 which is mounted above a calibrated dial 52. The dial 52 is preferably formed on a light stamping 53 which affords a cover for the worm wheel 48 and the worm 49.

The lower end of the vertical shaft 46 is pivotally supported in a boss 54 extending laterally from the bracket 47. Secured to said shaft 46 directly above the boss 54 is a crank arm 55 which pivotally supports a vertical clevis 56. Pivotally connected to said clevis 56 is a link 57 which has its other end pivotally connected to a clevis 58, said clevis 58 being pivotally mounted in a boss 59 integral with or secured to the upper end of one of the arms 35. Pivotally secured to the lower end of said arm 35 is a link 60 which extends underneath the base 2 to the upper end of an eccentrically mounted lever 61 which is pivotally supported on the side flange 2ª of the base 2 at 62 (Figure 4). The lower end of the lever 61 has pivotally connected thereto one end of a link 63, the other end of which is pivotally connected to the depending lower end of one of the arms 35 on the same side of the machine as the arm 35, last referred to. Openings which are indicated at 63ª are provided in the floor of the base 2 to permit the lower ends of the arms 35 to extend therethrough and to move a limited amount about their pivotal mountings in the brackets 33.

In the wrapping of tire casings, it is desirable that the beads thereof be pressed toward each other to facilitate a snug application of the wrapping material. Means which are provided for this purpose comprise arms 64 which are pivoted on the shuttle frame 10 at either side of the tire casing. Secured to the upper ends of said arms 64 are formed shoes 65 which slidably engage the beads of the tire at points adjacent to the point of application of the wrapping material. Said arms 64 are pivotally connected together at their lower ends for simultaneous movement toward or away from each other and pivotally secured to the upper end of one of said arms 64 at 66 is an adjusting lever 67 the lower end of which is pivoted to the shuttle frame at 68. Said lever has a hand operated pawl of usual construction which cooperates with a usual ratchet segment secured to the shuttle frame for locking the lever and consequently the arms 64 in adjusted position. Also secured to the outer ends of said arms 64 are flaring guiding arms 69 which facilitate the introduction of a tire casing or similar annular article into the machine.

In order to aid in positioning and guiding a tire casing or any similar annular article on the driving roll 38, I have provided a mechanism which is supported on a frame 70 pivotally supported on the shaft 36 and provided with an integral counter-weighted portion 71 depending below said shaft. Said counter-weighted portion 71 serves to normally hold the frame 70 in upright position and pivotally mounted at the upper end of said frame are guiding and positioning rollers 72 which extend outwardly from said frame in divergent directions. Also mounted on said frame between the rollers 72 is a horizontal guide roller 73 which interposed between the tire casing and the frame 70 when the former is being wrapped. Details of the construction just described are shown in Figure 9. The upper portion of the tire casing or any other annular article is held in position by a grooved guide roll 74 which is pivotally supported in a bracket 75 pivoted on an upright 76 extending upwardly from the upstanding portion 28 on the base 2 (Figure 1). A table 77 which is supported from the sub frame 1 and from the base 2 of the machine facilitates the insertion of articles to be wrapped.

In the wrapping of annular articles in machines of the type under consideration, it is often desirable to adhesively apply a peripheral securing strip which strip often bears advertising indicia of the maker or the like. This adhesive strip is indicated at 78 in Figure 3 and is ordinarily withdrawn from one of a series of reels 79 which are pivotally mounted in a casing 80 secured to the left hand end of the machine as shown in Figure 4. In order to facilitate the application of this peripheral strip from any one of said rolls 79, said casing 80 is slidably mounted on supporting rods 81 and 82 to permit the same to be laterally shifted to bring any one of said rolls into alignment with a moistening roller 83 over which said peripheral strip runs before it is applied to the wrapping on the tire casing or other annular article.

It will be observed from the foregoing description that this invention provides convenient control and adjusting mechanisms which facilitates the operation thereof in the wrapping of tire casings or similar annular articles. First of all, the ratchet connection to the driving and supporting rolls 37 and 38 makes it possible for the operator to easily manually turn the tire casing or other annular article in a rearward direction to properly position the same prior to application of the wrapping material. By providing such a ratchet mechanism, it is possible to include the corrugations 38ª or other frictional driving means since the rolls may be turned rearwardly with the tire and it is not necessary to slide the tire on the rolls as has been the case in previous mechanisms wherein a ratchet driving connection was provided. The worm driven adjusting mechanism and indicating dial makes it possible for an inexperienced operator to readily and properly position the annular article to be wrapped through adjustment of the driving rolls with a minimum of physical effort.

The laterally shiftable carriage for the rolls which carry the tape which is to be peripherally applied makes it possible to have a supply of rolls bearing different indicia in convenient position for instantaneous use without the necessity of removing the roll in use and inserting a new roll in its place.

Other advantages inherent to the construction provided will be obvious from the description of the construction of the mechanism previously referred to.

I am aware that numerous details of construction may be varied through a wide range without departing from the principles of this invention, and I therefore do not purpose limiting the patent granted otherwise than necessitated by the prior art.

I claim as my invention:

1. In a wrapping machine for annular articles, a pair of article supporting and driving rolls, means for driving said rolls, and supporting means for said rolls permitting the same to be freely rotated in one direction independently of said driving means.

2. In a wrapping machine for annular articles, article supporting and driving means, a mechanism for driving said means, and means permitting movement of said supporting and driving means in one direction independently of said driving mechanism.

3. In a wrapping machine, rotatable means for advancing an article to be wrapped, a mechanism for driving said means, and means permitting rotation of said means in one direction independently of said driving means.

4. In a wrapping machine, rotatable means for advancing an article to be wrapped, a mechanism for driving said means, and a ratchet connection between said driving mechanism and said rotatable means to permit free rearward rotation of the latter.

5. In a wrapping machine, rotatable means for advancing an article to be wrapped, means associated with said rotatable means for frictionally engaging such an article, a mechanism for driving said rotatable means, and means permitting movement of said rotatable means in one direction independently of said driving mechanism.

6. In a wrapping machine, a rotatable article supporting and driving roll, a mechanism for driving the same, means associated with said roll for increasing its tractive engagement with an article supported thereby, and means permitting rotation of said roll in one direction independently of said driving mechanism.

7. In a wrapping machine, rotatable means for advancing an article to be wrapped, a mechanism for driving said means, and means permitting free rotation of said rotatable means independently of said driving mechanism.

8. In a wrapping machine, means for advancing an article to be wrapped, a mechanism for driving said means, and means permitting free movement of said rotatable means independently of said driving mechanism.

9. In a wrapping machine, means for advancing an article to be wrapped, a mechanism for positioning said means, operating mechanism for said positioning means, and an upwardly facing position indicating dial associated with said operating means.

In testimony whereof I have hereunto subscribed my name.

PAUL PIERCE.